United States Patent
Yiu et al.

(10) Patent No.: US 9,904,563 B2
(45) Date of Patent: Feb. 27, 2018

(54) PROCESSOR MANAGEMENT

(71) Applicant: HTC Corporation, Taoyuan (TW)

(72) Inventors: Wen-Sheng Yiu, Taoyuan (TW);
Jen-Hao Chen, Taoyuan (TW);
Wen-Yu Liu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 14/973,757

(22) Filed: Dec. 18, 2015

(65) Prior Publication Data

US 2017/0177388 A1 Jun. 22, 2017

(51) Int. Cl.
G06F 1/00 (2006.01)
G06F 9/445 (2018.01)
G06F 11/34 (2006.01)
G06F 11/30 (2006.01)
G06F 9/26 (2006.01)

(52) U.S. Cl.
CPC ...... *G06F 9/44505* (2013.01); *G06F 11/3024* (2013.01); *G06F 11/3409* (2013.01); *G06F 9/26* (2013.01)

(58) Field of Classification Search
CPC ..................... G06F 1/32; G06F 1/26
See application file for complete search history.

(56) References Cited

U.S. PATENT DOCUMENTS

| 9,137,848 B2* | 9/2015 | Nho | G06F 1/324 |
| 2009/0328055 A1* | 12/2009 | Bose | G06F 1/3203 718/105 |
| 2010/0037038 A1* | 2/2010 | Bieswanger | G06F 1/3203 712/220 |
| 2010/0293312 A1* | 11/2010 | Sonnier | G06F 15/167 710/107 |
| 2011/0142064 A1* | 6/2011 | Dubal | H04L 47/122 370/412 |
| 2012/0079290 A1* | 3/2012 | Kumar | G06F 1/26 713/300 |
| 2012/0123995 A1* | 5/2012 | Boot | G01R 21/1333 706/54 |
| 2014/0026146 A1* | 1/2014 | Jahagirdar | G06F 9/4856 718/105 |
| 2014/0059548 A1* | 2/2014 | Ahmad | G06F 9/5088 718/100 |

* cited by examiner

*Primary Examiner* — Phil Nguyen
(74) *Attorney, Agent, or Firm* — CKC & Partners Co., Ltd.

(57) ABSTRACT

A control method is disclosed. The control method is suitable for an electronic device including first processing cores. The control method includes operations as follows. A device status of the electronic device is monitored. A threshold loading level of the first processing cores is dynamically set according to the device status. A loading management of multi-processor is performed according to a current loading level of the processing cores and the threshold loading level.

15 Claims, 5 Drawing Sheets

PROCESSOR MANAGEMENT

BACKGROUND

Field of Invention

The present application relates to a multi-processor system. More particularly, the present application relates to a multi-processor system and a control method thereof.

Description of Related Art

Processors are key components for electronic devices such as computers, mobile phones, tablet computers, etc. The processors are highly developed to have various functions and powerful performance. At the same time, the cutting-edge processors have issues of causing the power consumption and elevating the device temperature. Especially for the processors on mobile devices, heavy power consumption will reduce the battery life of the mobile devices, and high device temperature will cause some malfunctions to the processors or other components in the mobile devices.

SUMMARY

An aspect of the present disclosure is to provide a control method, which is suitable for an electronic device including first processing cores. The control method includes operations as follows. A device status of the electronic device is monitored. A threshold loading level of the first processing cores is dynamically set according to the device status. A loading management of multi-processor is performed according to a current loading level of the processing cores and the threshold loading level.

The disclosure further provides a non-transitory computer readable storage medium with a computer program to execute aforesaid control method.

The disclosure further provides an electronic device, which includes sensor module and a processor module. The sensor module is configured for monitoring a device status. The processor module includes first processing cores and a management unit, the management unit is configured for dynamically setting a threshold loading level of the first processing cores according to the device status and performing a loading management of multi-processor to the first processing cores according to a current loading level of the processing cores and the threshold loading level.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
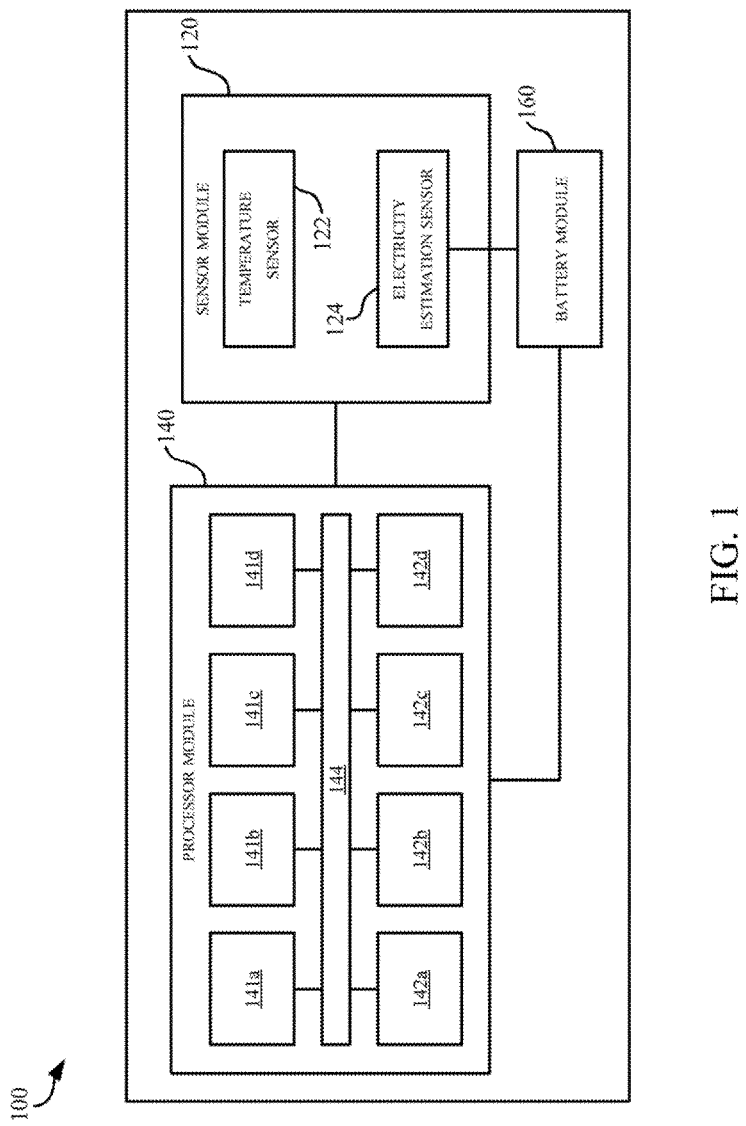
FIG. 1 is a schematic diagram illustrating an electronic device according to some embodiments of the disclosure.

Reference will now be made in detail to the present embodiments of the disclosure, examples of which are illustrated in the accompanying drawings. Wherever possible, the same reference numbers are used in the drawings and the description to refer to the same or like parts.

Figure 2:
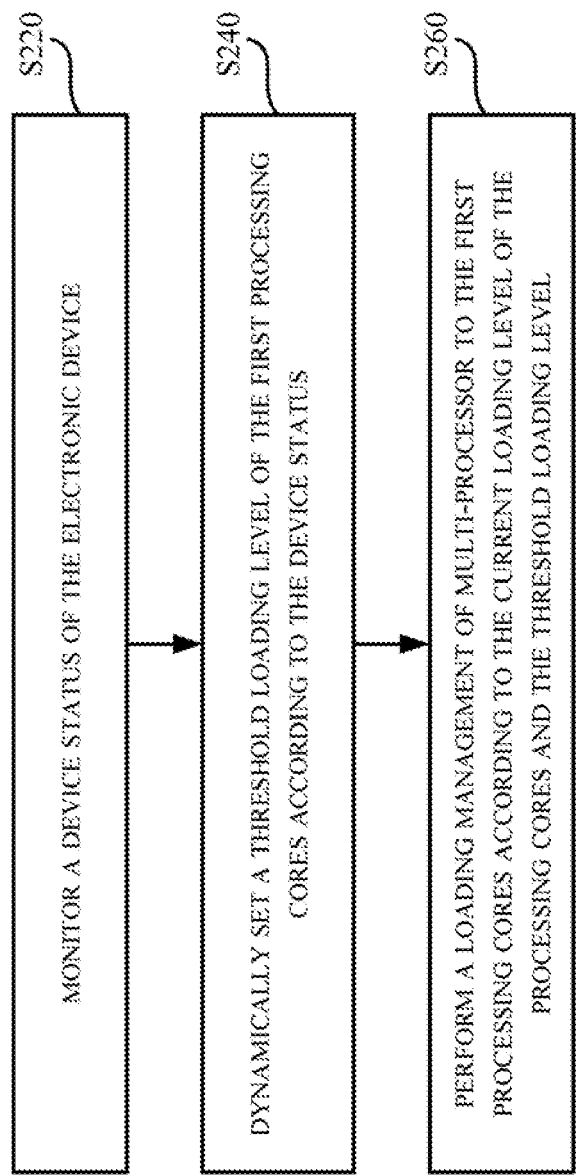
FIG. 2 is a flow chart diagram illustrating a control method suitable for the electronic device in FIG. 1.

Reference is made to FIG. 1 and FIG. 2. FIG. 1 is a schematic diagram illustrating an electronic device 100 according to some embodiments of the disclosure. FIG. 2 is a flow chart diagram illustrating a control method 200 suitable for the electronic device 100 in FIG. 1. As illustrated in FIG. 1, the electronic device 100 includes a sensor module 120 and a processor module 140. The sensor module 120 is configured for monitoring a device status of the electronic device 100.

In some embodiments, the device status includes a temperature reading of the electronic device 100, and the sensor module 120 includes a temperature sensor 122 for measuring the temperature reading. In some practices, the temperature sensor 122 is an integrated sensor integrated in a battery module 160 for measuring the temperature reading on a surface of the battery module 160. In some other practices, the temperature sensor 122 is a stand-alone temperature sensor disposed around some key components (e.g., a memory, a displayer, an antenna, the processor module 140, or the battery module 160) within the electronic device 100 for measuring a characteristic temperature of the electronic device 100.

In some embodiments, the device status includes a remaining electricity level of the electronic device 100, and the sensor module 120 includes an electricity estimation sensor 124 coupled to the battery module 160. The electricity estimation sensor 124 is configured for estimating the remaining electricity level of the battery module 160 according to an output voltage and/or an output current amplitude of the battery module 160.

In some embodiments, the device status includes a combination of the temperature reading, the remaining electricity level and/or any equivalent device status of the electronic device 100.

In some embodiments, the processor module 140 includes a plurality of first processing cores 141a, 141b, 141c and 141d and a management unit 144. The processing cores 141a, 141b, 141c and 141d are utilized to execute some tasks on the electronic device 100. Aforesaid tasks include reading, writing, calculating, comparing, floating computation, differentiating, converting, and any equivalent operations based on user's instructions or the functions to be performed on the electronic device 100.

The control method 200 illustrated in FIG. 2 is configured for managing loading levels of the processing cores of the processor module 140 according to the device status, so as to avoid the electronic device 100 being over-heated and/or to prolong a battery life of the electronic device 100. As shown in FIG. 2, the operation S220 of the control method 200 is performed to monitor a device status of the electronic device.

In some embodiments, the processor module 140 further includes second processing cores 142a, 142b, 142c and 142d. The first processing cores 141a, 141b, 141c and 141d have higher performance and higher power consumption than the second processing cores 142a, 142b, 142c and 142d. The embodiments illustrated in the FIG. 1, the processor module 140 has eight processing cores. These eight processing cores include four first processing cores 141a, 141b, 141c and 141d with higher performance and higher power consumption, and another four second processing cores 142a, 142b, 142c and 142d with lower performance and lower power consumption.

However, number of processing cores in the first processing cores and in the second processing cores of the disclosure is not limited to the embodiments illustrated in FIG. 1. According to embodiments of the disclosure, the processor module 140 includes M first processing cores and N second processing cores, in which M is a positive integer larger than or equal to 2, and N is integer larger than or equal to 0. In some embodiments, the processor module 140 includes six first processing cores and four second processing cores, so as to construct a ten-core processor. In some embodiments, the processor module 140 includes two first processing cores and no second processing core, so as to construct a two-core processor. For illustrations, the following embodiments are demonstrated with M=4 and N=4.

The management unit 144 is coupled to the first processing cores 141a, 141b, 141c and 141d and the second processing cores 142a, 142b, 142c and 142d. In some practices, the management unit 144 is a controller integrated circuit of the processor module 140. In some other practices, the management unit 144 is a driver programs, software instructions, firmware instructions executed by at least one of the first processing cores 141a-141d or the second processing cores 142a-142d the in the processor module 140.

In some embodiments, the management unit 144 is configured for dynamically setting a threshold loading level of the first processing cores 141a, 141b, 141c and 141d according to the device status. The management unit 144 is further configured for performing a loading management of multi-processor to the first processing cores 141a, 141b, 141c and 141d according to a current loading level of the processing cores and the threshold loading level. The loading management of multi-processor in some embodiments is utilized to manage, balance, monitor and distribute loadings among different processing cores 141a-141d.

The management unit 144 is configured to check the current loading levels of each one of the first processing cores 141a, 141b, 141c and 141d. The current loading levels of the first processing cores 141a, 141b, 141c and 141d are compared with the threshold loading level by the management unit 144.

The current loading level is detected according to, for example, an operational frequency, a task amount or a ratio of running time to idle time of the first processing cores 141a-141d.

In some examples, the current loading level is detected according to the operational frequency of the first processing cores 141a-141d. It is assumed that a maximum operational frequency of the first processing cores 141a-141d is 2.4 Gigahertz (GHz). If a current operational frequency of the first processing core 141a is 1.8 GHz, the current loading level of the first processing core 141a is detected as 75%. If the current operational frequency of the first processing core 141a is 1.2 GHz, the current loading level of the first processing core 141a is detected as 50%.

In some other examples, the current loading level is detected according to the task amount of the first processing cores 141a-141d. It is assumed that a maximum task capacity of a task queue the first processing cores 141a-141d is 4096 tasks. If a current task amount of the first processing core 141a is 1024 tasks, the current loading level of the first processing core 141a is detected as 25%. If the current task amount of the first processing core 141a is 2048 tasks, the current loading level of the first processing core 141a is detected as 50%.

In some other examples, the current loading level is detected according to the ratio of running time to idle time of the first processing cores 141a-141d. It is assumed that an estimation time window of the first processing cores 10 seconds. If the first processing core 141a is active for 8 seconds and is idle for 2 seconds in the estimation time window, the current loading level of the first processing core 141a is detected as 80%. If the first processing core 141a is active for 3 seconds and is idle for 7 seconds in the estimation time window, the current loading level of the first processing core 141a is detected as 30%.

The threshold loading level is also defined in the corresponding way according to the operational frequency, the task amount or the ratio of running time to idle time of the first processing cores 141a-141d.

As shown in FIG. 2, the operation S240 is performed to dynamically set a threshold loading level of the first processing cores 141a, 141b, 141c and 141d according to the device status.

In some embodiments, the threshold loading level is set according to the temperature reading. For examples, the threshold loading level is set to 100% when the temperature reading is lower than the 35° C.; the threshold loading level is set to 80% when the temperature reading is larger than or equal to 35° C. and lower than 37° C.; the threshold loading level is set to 60% when the temperature reading is larger than or equal to 37° C. and lower than 38° C.; and, the threshold loading level is set to 0% when the temperature reading larger than or equal to 38° C. Aforesaid numbers of the temperature readings and the threshold loading levels are disclosed for demonstration, and the disclosure is not limited thereto. The threshold loading level is set to be negatively correlated to the temperature reading.

In some embodiments, the threshold loading level is set according to the remaining electricity level. For examples, the threshold loading level is set to 100% when the remaining electricity level is higher than the 30% of total electricity capacity of the battery module 160; and, the threshold loading level is set to 60% when the temperature reading is lower than or equal to 30% of total electricity capacity of the battery module 160. Aforesaid numbers of the remaining electricity levels and the threshold loading levels are disclosed for demonstration, and the disclosure is not limited thereto. The threshold loading level is set to be positively correlated to the remaining electricity level.

As shown in FIG. 2, the operation S260 of the control method 200 is to perform a loading management of multi-processor to the first processing cores 141a-141d according to the current loading level of the processing cores 141a-141d and the threshold loading level. The loading management of multi-processor in some embodiments is utilized to manage, balance, monitor and distribute loadings among different processing cores 141a-141d.

Figure 3:
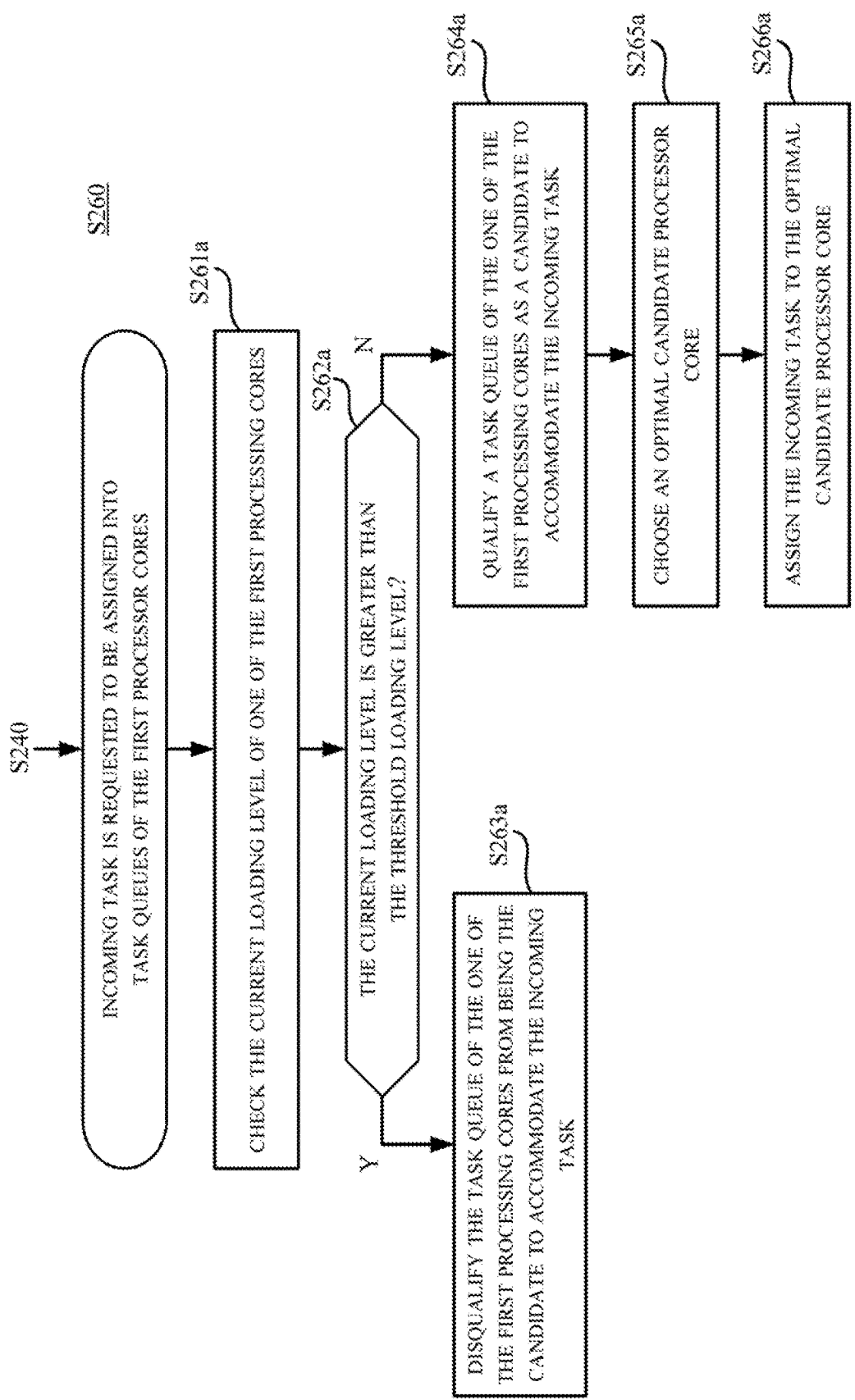
FIG. 3, FIG. 4 and FIG. 5 are flow chart diagrams illustrating further operations of the loading management performed to the first processing cores according to three embodiments of the disclosure.
Figure 4:
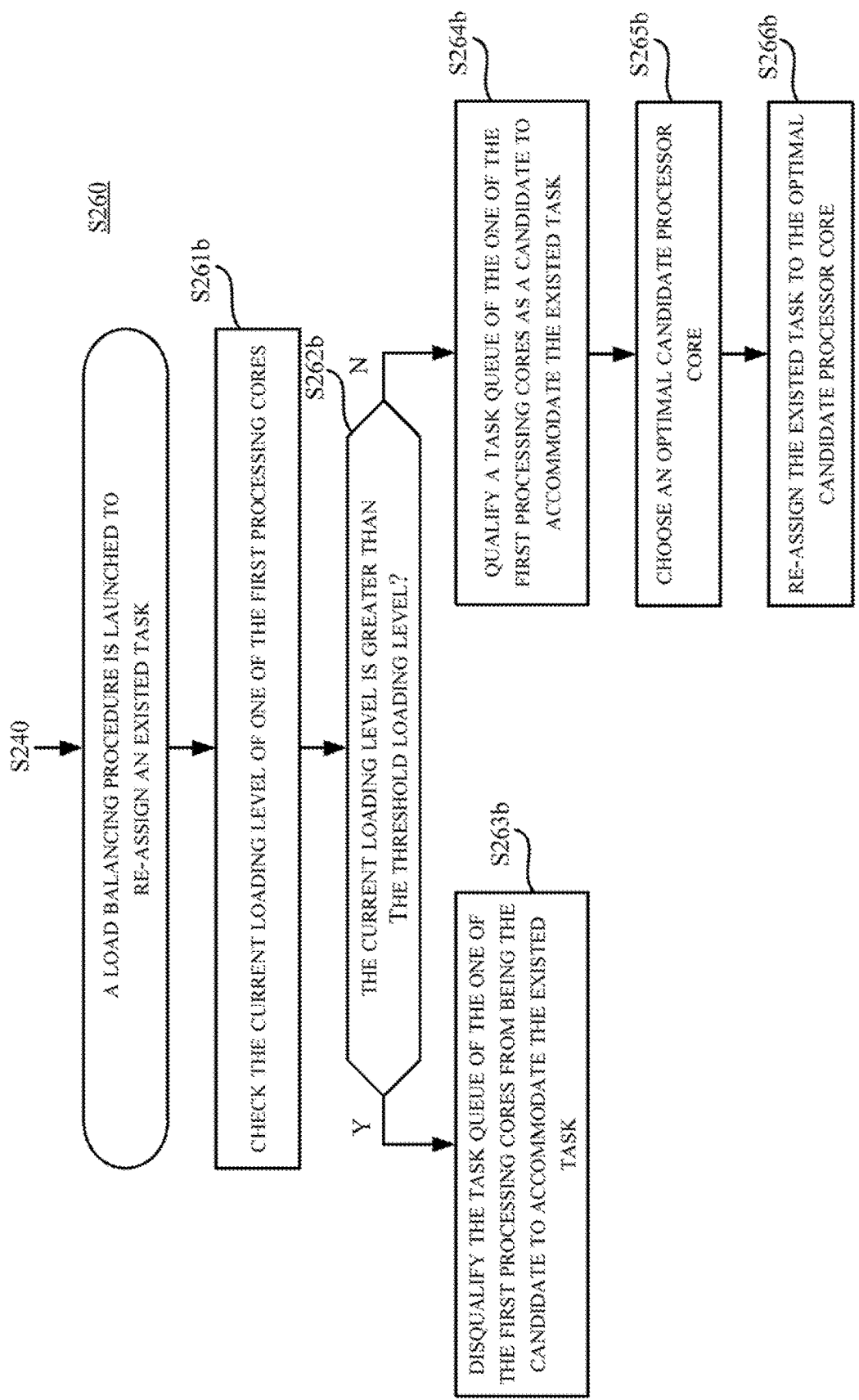
Figure 5:
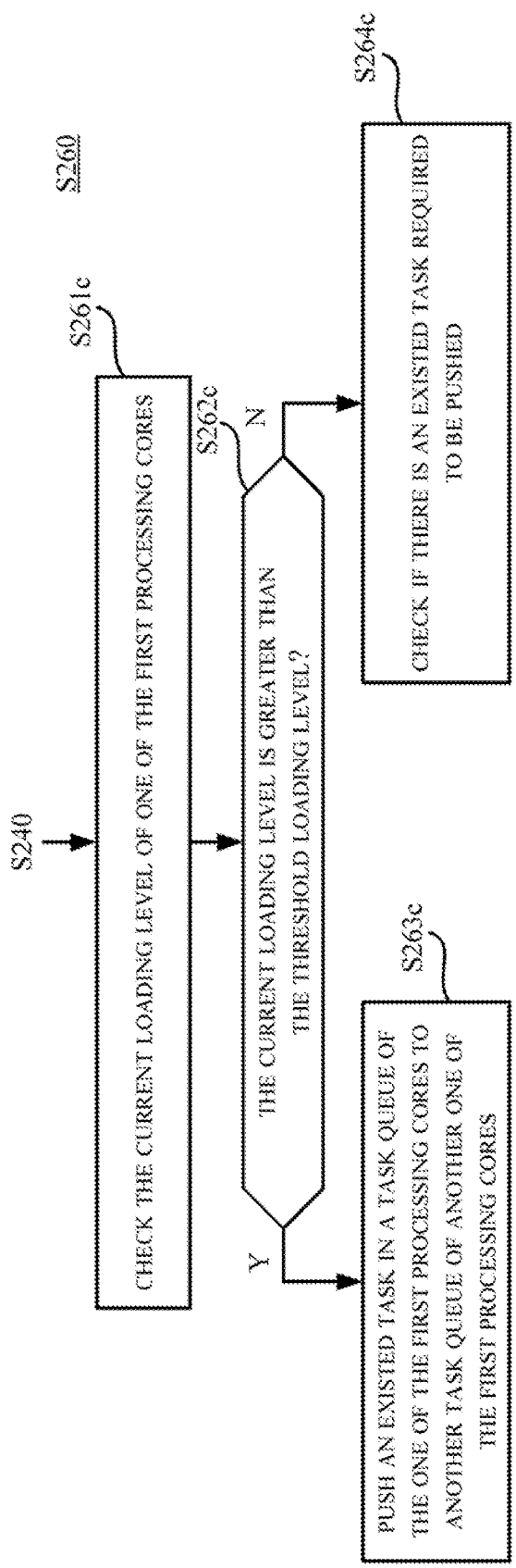

Reference is further made to FIG. 3, FIG. 4 and FIG. 5, which are flow chart diagrams illustrating further operations of the loading management (i.e., the operation S260) performed to the first processing cores 141a-141d according to three embodiments of the disclosure.

As shown in FIG. 3, the loading management in some embodiments includes operations S261a-S266a. When the user launches an application, triggers a function on the electronic device 100 or any process/procedure is activated an the electronic device 100, there will be an incoming task to be processed by the processor module 140.

There are four task queues corresponding to the first processor cores 141a-141d. Each of the task queues is utilized to accommodate task to be executed by the corresponding first processor core.

When the incoming task is related to an important function of user's interest, a foreground function or a task with high-priority, the incoming task will be assigned to one task queue selected from the task queues of the first processor cores 141a-141d.

In response to that an incoming task is requested to be assigned into the task queues of the first processor cores 141a-141d, operation S261a is performed to check the current loading level of one of the first processing cores 141a, 141b, 141c or 141d. Operation S262a is performed to compare the current loading level of the one of the first processing core 141a, 141b, 141c or 141d with the threshold loading level. If the current loading level of the one of the first processing cores 141a, 141b, 141c or 141d exceeds the threshold loading level, operation S263a is performed to disqualify the task queue of the one of the first processing cores 141a, 141b, 141c or 141d from being the candidate to accommodate the incoming task. If the current loading level of the one of the first processing cores 141a, 141b, 141c or 141d is below the threshold loading level, operation S264a is performed to qualify the task queue of the one of the first processing cores 141a, 141b, 141c or 141d as a candidate to accommodate the incoming task.

In some embodiments, operations S261a-S264a are performed individually to each one of the first processing cores 141a-141d. For example, it is assumed that the threshold loading level set to 80% because the temperature reading is larger than or equal to 35° C. and lower than 37° C., and the current loading levels of the first processing cores 141a-141d are 90%, 35%, 95% and 15% respectively, such that the first processing cores 141a and 141c will be disqualified and the first processing cores 141b and 141d will be qualified as candidates to accommodate and execute the incoming task.

In some embodiments, operation S265a is performed to choose an optimal candidate processor core from the qualified candidates, such as first the processing cores 141b and 141d. Operation S266a is performed to assign the incoming task to the optimal candidate processor core. Therefore, the incoming task will not be assigned to the first processing cores 141a and 141c with their current loading levels over the threshold loading level.

In another example, it is assumed that the threshold loading level set to 0% because the temperature reading is larger than 38° C., no incoming task will be assigned to the first processing cores 141a-141d anymore, such that the first processing cores 141a-141d will be turned off or switched into a standby state (right away or after the existed tasks are finished) for a while when the threshold loading level is set to be zero according to the device status. In this case, the incoming task of the electronic device is assigned to the second processing cores 142a-142d. The second processing cores 142a-142d are relatively low-power processing cores compared to the first processing cores 141a-141d. The second processing cores 142a-142d will generate less heat and consume less power, such that the electronic device 100 will have a chance to cool down and a battery life of the electronic device 100 will be extended.

If the device status allows (the temperature reading is low and/or the remaining electricity level is enough), the incoming task will be assigned to available one of the first processing cores, such that the incoming task will be completed faster by the first processing cores 141a-141d with relatively higher performance compared to the second processing cores 142a-142d.

As shown in FIG. 4, the loading management in some embodiments includes operations S261b-S266b. When the task queues of the first processing cores 141a-141d are not even, a load balancing procedure will be launched to re-assign existed tasks within the task queues.

In response to that the load balancing procedure is launched to re-assign an existed task in one of task queues of the first processor cores 141a-141d, operation S261b is performed to check the current loading level of one of the first processing cores 141a-141d. Operation S262b is performed to compare the current loading level with the threshold loading level. If the current loading level of the one of the first processing cores 141a-141d exceeds the threshold loading level, operation S263b is performed to disqualify the task queue of the one of the first processing cores 141a-141d from being the candidate to accommodate the existed task. If the current loading level of the one of the first processing cores 141a-141d is below the threshold loading level, operation S264b is performed to qualify the task queue of the one of the first processing cores 141a-141d as a candidate to accommodate the existed task. The qualified first processing core will be a candidate to execute the existed task.

In some embodiments, operations S261b-S264b are performed individually to each one of the first processing cores 141a-141d. For example, it is assumed that the threshold loading level set to 80% because the temperature reading is larger than or equal to 35° C. and lower than 37° C., and the current loading levels of the first processing cores 141a-141d are 90%, 35% 95% and 15% respectively, such that the first processing cores 141a and 141c will be disqualified and the first processing cores 141b and 141d will be qualified as candidates to accommodate and execute the existed task.

In some embodiments, operation S265b is performed to choose an optimal candidate processor core from the qualified candidates, such as first the processing cores 141b and 141d. Operation S266b is performed to re-assign the existed task (e.g., from the task queues of first processing cores 141a and 141c over the threshold loading level) to the optimal candidate processor core.

In another example, it is assumed that the threshold loading level set to 0% because the temperature reading is larger than 38° C., no existed task will be re-assigned to the first processing cores 141a-141d anymore, such that the first processing cores 141a-141d will be turned off or switched into a standby state (right away or after the existed tasks are finished) for a while when the threshold loading level is set to be zero according to the device status. In this case, the existed tasks in the task queues of the first processing cores 141a-141d are re-assigned to the second processing cores 142a-142d, such that the electronic device 100 will have a chance to cool down and a battery life of the electronic device 100 will be extended.

If the device status allows (the temperature reading is low and the remaining electricity level is enough), the existed task will be re-assigned to available one of the first processing cores 141a-141d, such that the incoming task will be completed faster by the first processing cores 141a-141d with relatively higher performance compared to the second processing cores 142a-142d.

As shown in FIG. 5, the loading management in some embodiments includes operations S261c-S264c. Operation S261c is performed to check the current loading level of one of the first processing cores 141a-141d. Operation S262c is performed to compare the current loading level with the threshold loading level. If the current loading level of the one of the first processing cores 141a-141d exceeds the threshold loading level, operation S263c is performed to push an existed task in the task queue of the first processing core (with the current loading level over the threshold loading level) to another task queue of another one of the first processing cores. If the current loading level of the one of the first processing cores 141a-141d is below the threshold loading level, operation S264c is performed to check if there is an existed task required to be pushed according to other rules, such as the existed task is located in a task queue which is almost full or the existed task is an emergency task, etc.

In some embodiments, operations S261c-S264c are performed individually to each one of the first processing cores 141a-141d. For example, it is assumed that the threshold loading level set to 80% because the temperature reading is larger than or equal to 35° C. and lower than 37° C., and the current loading levels of the first processing cores 141a-141d are 90%, 35%, 95% and 15% respectively, such that the existed tasks in the task queues of the first processing cores 141a and 141c will be pushed to another task queue, which is available to accommodate the existed tasks. In the case, the first processing cores 141a and 141c with their current loading levels over the threshold loading level will have a chance to decrease their current loading levels. On the other hands, the processing cores 141b and 141d with their current loading levels lower than the threshold loading level will take over and execute the existed tasks.

Some embodiments of the disclosure provide a non-transitory computer readable storage medium with a computer program, which is utilized to execute aforesaid control method 200 illustrated in FIG. 2 to FIG. 5.

Based on aforesaid embodiments, the control method 200 is able to dynamically set a threshold loading level of the first processing cores 141a-141d according to the device status. If the electronic device 100 is over-heated, the threshold loading level will be decreased. If the electronic device 100 is running out of electricity, the threshold loading level will be decreased. If the device status allows, the incoming tasks and the existed tasks will be handled by the first processing cores 141a-141d, so as to elevate the performance of the electronic device 100.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A control method, suitable for an electronic device comprising first processing cores, the control method comprising:
   monitoring a device status of the electronic device;
   dynamically setting a threshold loading level of the first processing cores according to the device status; wherein the device status comprises at least one of a temperature reading of the electronic device and a remaining electricity level of the electronic device; and
   performing a loading management of multi-processor to the first processing cores according to a current loading level of the processing cores and the threshold loading level;
   wherein the loading management comprises:
   in response to that an incoming task is requested to be assigned into task queues of the first processor cores, checking the current loading level of each of the first processing cores;
   if the current loading level of one of the first processing cores is below the threshold loading level, qualifying a task queue of the one of the first processing cores as a candidate to accommodate the incoming task; and
   if the current loading level of the first processing cores exceeds the threshold loading level, disqualifying the task queue of the one of the first processing cores from being the candidate to accommodate the incoming task.

2. The control method of claim 1, wherein the loading management comprises:
   in response to that a load balancing procedure is launched to re-assign an existed task, checking the current loading level of each of the first processing cores;
   if the current loading level of one of the first processing cores is below the threshold loading level, qualifying a task queue of the one of the first processing cores as a candidate to accommodate the existed task re-assigned by the load balancing procedure; and
   if the current loading level of the one of the first processing cores exceeds the threshold loading level, disqualifying the task queue of the one of the first processing cores from being the candidate to accommodate the existed task.

3. The control method of claim 1, wherein the loading management comprises:
   checking the current loading level of one of the first processing cores; and
   if the current loading level of the one of the first processing cores exceeds the threshold loading level, pushing an existed task in a task queue of the one of the first processing cores to another task queue of another one of the first processing cores.

4. The control method of claim 1, wherein the current loading level is detected according to an operational frequency, a task amount or a ratio of running time to idle time of the first processing cores.

5. A non-transitory computer readable storage medium with a computer program to execute a control method, wherein the control method comprises:
   monitoring a device status of an electronic device;
   dynamically setting a threshold loading level applied to first processing cores of the electronic device according to the device status; wherein the device status comprises at least one of a temperature reading of the electronic device and a remaining electricity level of the electronic device; and
   performing a loading management of multi-processor to the first processing cores according to a current loading level of the processing cores and the threshold loading level;
   wherein the loading management comprises:
   in response to that an incoming task is requested to be assigned into task queues of the first processor cores, checking the current loading level of each of the first processing cores;
   if the current loading level of one of the first processing cores is below the threshold loading level, qualifying a task queue of the one of the first processing cores as a candidate to accommodate the incoming task; and
   if the current loading level of the first processing cores exceeds the threshold loading level, disqualifying the task queue of the one of the first processing cores from being the candidate to accommodate the incoming task.

6. The non-transitory computer readable storage medium of claim 5, wherein the loading management comprises:
   in response to that a load balancing procedure is launched to re-assign an existed task, checking the current loading level of each of the first processing cores;
   if the current loading level of one of the first processing cores is below the threshold loading level, qualifying a task queue of the one of the first processing cores as a candidate to accommodate the existed task re-assigned by the load balancing procedure; and
   if the current loading level of the one of the first processing cores exceeds the threshold loading level, disqualifying the task queue of the one of the first processing cores from being the candidate to accommodate the existed task.

7. The non-transitory computer readable storage medium of claim 5, wherein the loading management comprises:
   checking the current loading level of one of the first processing cores; and
   if the current loading level of the one of the first processing cores exceeds the threshold loading level, pushing an existed task in a task queue of the one of the first processing cores to another task queue of another one of the first processing cores.

8. An electronic device, comprising:
   a sensor module, configured for monitoring a device status; and
   a processor module comprising first processing cores and a management unit, the management unit being configured for dynamically setting a threshold loading level of the first processing cores according to the device status and performing a loading management of multi-processor to the first processing cores according to a current loading level of the first processing cores and the threshold loading level; wherein the device status comprises at least one of a temperature reading of the electronic device and a remaining electricity level of the electronic device;
   wherein the loading management comprises:
   in response to that an incoming task is requested to be assigned into task queues of the first processor cores, checking the current loading level of each of the first processing cores;
   if the current loading level of one of the first processing cores is below the threshold loading level, qualifying a task queue of the one of the first processing cores as a candidate to accommodate the incoming task; and
   if the current loading level of the first processing cores exceeds the threshold loading level, disqualifying the task queue of the one of the first processing cores from being the candidate to accommodate the incoming task.

9. The electronic device of claim 8, wherein the loading management comprises:
   in response to that a load balancing procedure is launched to re-assign an existed task, checking the current loading level of each of the first processing cores;
   if the current loading level of one of the first processing cores is below the threshold loading level, qualifying a task queue of the one of the first processing cores as a candidate to accommodate the existed task re-assigned by the load balancing procedure; and
   if the current loading level of the one of the first processing cores exceeds the threshold loading level, disqualifying the task queue of the one of the first processing cores from being the candidate to accommodate the existed task.

10. The electronic device of claim 8, wherein the loading management comprises:
    checking the current loading level of one of the first processing cores; and
    if the current loading level of the one of the first processing cores exceeds the threshold loading level, pushing an existed task in a task queue of the one of the first processing cores to another task queue of another one of the first processing cores.

11. The electronic device of claim 8, wherein the current loading level is detected according to an operational frequency, a task amount or a ratio of running time to idle time of the first processing cores.

12. The control method of claim 1, wherein the electronic device further comprises second processing cores, the first processing cores have higher performance and higher power consumption than the second processing cores.

13. The control method of claim 12, wherein the first processing cores are turned off or switched into a standby state when the threshold loading level is set to be zero according to the device status, such that the incoming task or an existed task of the electronic device is assigned to the second processing cores.

14. The electronic device of claim 8, wherein the processor module further comprises second processing cores, the first processing cores have higher performance and higher power consumption than the second processing cores.

15. The electronic device of claim 14, wherein the first processing cores are turned off or switched into a standby state when the threshold loading level is set to be zero according to the device status, such that the incoming task or an existed task is assigned to the second processing cores.

* * * * *